(12) United States Patent  
Ohashi et al.

(10) Patent No.: US 9,352,569 B2
(45) Date of Patent: May 31, 2016

(54) INK JET RECORDING METHOD (71) Applicant: Seiko Epson Corporation, Tokyo (JP)

(72) Inventors: Masakazu Ohashi, Shiojiri (JP); Toru Saito, Yamagata-mura (JP); Tomoki Shinoda, Shiojiri (JP); Masashi Kamibayashi, Matsumoto (JP); Yoshihiro Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 14/181,030

(22) Filed: Feb. 14, 2014

(65) Prior Publication Data

US 2014/0232788 A1 Aug. 21, 2014

(30) Foreign Application Priority Data

Feb. 15, 2013 (JP) .................................. 2013-027616

(51) Int. Cl.
*B41J 2/21* (2006.01)
*B41J 2/145* (2006.01)
*B41J 2/045* (2006.01)
*B41J 2/15* (2006.01)
*B41J 3/407* (2006.01)
*C09D 11/322* (2014.01)

(52) U.S. Cl.
CPC .............. *B41J 2/145* (2013.01); *B41J 2/04581* (2013.01); *B41J 2/04588* (2013.01); *B41J 2/15* (2013.01); *B41J 3/4078* (2013.01); *C09D 11/322* (2013.01)

(58) Field of Classification Search
CPC .... B41J 2/2132; B41J 2202/20; B41J 2/0458; B41J 2/04541; B41J 2/1631
USPC ......................................... 347/40, 43
See application file for complete search history.

(56) References Cited

U.S. PATENT DOCUMENTS

| 6,099,108 | A | * | 8/2000 | Weber et al. | ..................... 347/43 |
| 6,120,143 | A | * | 9/2000 | Narushima | ................ B41J 2/15 346/138 |
| 6,155,670 | A | * | 12/2000 | Weber et al. | ..................... 347/43 |
| 6,259,463 | B1 | * | 7/2001 | Askeland et al. | ............... 347/15 |
| 6,702,425 | B1 | * | 3/2004 | Yip et al. | ......................... 347/40 |
| 7,552,985 | B2 | * | 6/2009 | Kawatoko et al. | .............. 347/15 |
| 7,731,332 | B2 | * | 6/2010 | Hori | ................................ 347/43 |

(Continued)

FOREIGN PATENT DOCUMENTS

JP 2003-096340 A 4/2003
JP 2007-522285 A 8/2007
WO 2005/071026 A1 8/2005

*Primary Examiner* — Matthew Luu
*Assistant Examiner* — Patrick King
(74) *Attorney, Agent, or Firm* — Nutter McClennen & Fish LLP; John J. Penny, Jr.; Alex Nagorniy (57) ABSTRACT An ink jet recording method is provided in which an ink jet head having a first nozzle array and a second nozzle array which is arranged along the first nozzle array, in which the distance between the first nozzle array and the second nozzle array is 15 mm or greater and a nozzle density of the first nozzle array and a nozzle density of the second nozzle array are 600 dpi or greater is used, and while varying the relative position of the ink jet head in a direction intersecting an array direction of the first nozzle array and the second nozzle array with respect to a recording medium, an ink composition is adhered to the recording medium by performing a scanning which discharges the ink composition at a frequency of 12 kHz or greater from nozzles in the first nozzle array and the second nozzle array.

20 Claims, 2 Drawing Sheets

(56) References Cited

U.S. PATENT DOCUMENTS

| | | | |
|---|---|---|---|
| 2004/0189728 A1* | 9/2004 | Nakajima | 347/14 |
| 2005/0195256 A1* | 9/2005 | Tomotake et al. | 347/100 |
| 2008/0252673 A1* | 10/2008 | Wada et al. | 347/12 |
| 2009/0153606 A1* | 6/2009 | Mizutani | B41J 19/142 347/12 |
| 2012/0056947 A1* | 3/2012 | Tanuma et al. | 347/71 |
| 2012/0120174 A1* | 5/2012 | Hosoya et al. | 347/104 |

* cited by examiner

INK JET RECORDING METHOD

BACKGROUND

1. Technical Field

The present invention relates to an ink jet recording method.

2. Related Art

In the related art, various methods have been used as a recording method for forming an image based on image data signals on a recording medium such as paper. Among these, in an ink jet system, it is possible to efficiently use an ink composition and running cost is low since the ink jet system is not expensive and the ink composition is discharged onto only the necessary image portion to directly form an image on the recording medium. Furthermore, the ink jet system makes little noise, and therefore, it is excellent as a recording method.

In recent years, applying the ink jet recording system to dyeing of cloth (textile printing) has been studied. For example, an ink jet ink composition is disclosed in which in order to provide durability and color fastness against washing to a textile which is ink jet printed, an aqueous vehicle, a colorant and a crosslinked polyurethane dispersant are included, a colorant is soluble or dispersible in the aqueous vehicle and a weight ratio of the colorant to the crosslinked polyurethane is at least about 1.0 (for example, refer to JP-T-2007-522285). Moreover, a fluorescent ink for an ink jet printing containing inorganic phosphor particles in order to provide the fluorescent ink for the ink jet printing which solves the problems of fading and bleeding, has a light emission with high luminance for a long period of time, and expresses a color and an image different from those visually observed under a visible light when a special excitation light such as a black light is irradiated is disclosed (for example, refer to JP-A-2003-96340).

In the case of printing on cloth, a solid image with a color may be recorded in order to form a color image with the excellent concealing property. Furthermore, in the case of printing on dark cloth, a white image may be recorded on the cloth as a solid image in advance in order to improve the appearance of a color image by concealing the cloth, or a white solid image may be recorded in order to record a white image with the excellent concealing property on the cloth. However, in the method in the related art, there are problems in which contamination occurs by the adhesion of an ink composition to a nozzle plate and a cleaning frequency is increased. Furthermore, there are problems in which the concealing property of an image is also poor, and a printing speed and a drying speed are also low.

SUMMARY

An advantage of some aspects of the invention is to provide an ink jet recording method in which contamination by the adhesion of an ink composition to a nozzle plate is unlikely to occur, a cleaning frequency is low, images with the excellent concealing property can be printed and a printing speed is excellent.

The present inventors performed thorough studies. When an ink composition lands on a recording medium, ink mist (hereinafter, simply referred to as "mist") is generated. Normally, the adhesion to a nozzle is small since the ink mist can be diffused in an entire ink jet recording apparatus and the diffused mist is recovered by a fan. However, when the ink composition is discharged from all the nozzles at a predetermined frequency, in particular, contamination around the nozzles by the mist is frequently observed. By air flow due to the ink droplets discharged from all the nozzles of a nozzle array, an air layer is formed by the air flow called an air curtain along the line of the nozzle array. In this case, it is considered that the ink mist between a head and a recording medium cannot move beyond the air curtain, and therefore, the mist remains around the nozzle.

Such a phenomenon is commonly observed in the case where an image having a large amount of adhered ink is recorded in order to improve the concealing property. In the case of recording a solid image as described above, the ink composition is discharged from all the nozzles at a predetermined discharging frequency so as not to slow down the printing speed. Then, it is considered that by air flow due to the ink droplets discharged from all the nozzles of the nozzle array, an air layer is formed by the air flow called an air curtain along the line of the nozzle array, and therefore, the ink mist remains.

When the ink mist remains as described above, the adhered amount of the ink composition to the nozzle plate between the nozzle arrays is increased. Particularly, since the adhesion of the mist around the nozzle is also increased, the number of nozzles which cause a discharge failure (non-discharge and deflection) are increased, and therefore, it is necessary to increase the frequency of cleaning for removing the contaminant of the ink composition by wiping the nozzles with a wiper.

Furthermore, it is found that the ink mist is generated depending on the size of an ink droplet. The ink mist is formed of ink droplets which cannot land on a recording medium or formed of smaller ink droplets called satellites, separated from an ink droplet body. For this reason, in the case where the ink droplet is large, the air resistance is low, all the ink droplets can land on a recording medium, and therefore, the mist is unlikely to be generated. However, when the ink droplet is large, the amount of the ink which lands on a recording medium is increased or the thickness thereof is increased, and therefore, an ink drying speed is reduced. Therefore, the amount of the ink which lands is reduced or the thickness thereof is reduced by reducing the size of ink droplets, and therefore, an ink drying time can be shortened. The attempt is made to shorten the time required to record a color image on a white image. However, in this case, the ink mist is likely to be generated. Therefore, the inventors have found that the problems can be solved by widening the space between the nozzle arrays and setting a predetermined printing condition and have completed the invention.

That is, the invention is as follows.

[1] An ink jet recording method in which an ink jet head having a first nozzle array and a second nozzle array which is arranged along the first nozzle array, in which the distance between the first nozzle array and the second nozzle array is 15 mm or greater and a nozzle density of the first nozzle array and a nozzle density of the second nozzle array are 600 dpi or greater is used, and while varying the relative position of the ink jet head in a direction intersecting an array direction of the first nozzle array and the second nozzle array with respect to a recording medium, an ink composition is made to adhere to the recording medium by performing a scanning which discharges the ink composition at a frequency of 12 kHz or greater from nozzles in the first nozzle array and the second nozzle array.

[2] The ink jet recording method described in [1], in which an adhered amount of the ink with respect to the recording medium is 150 mg/inch$^2$ or greater.

[3] The ink jet recording method described in [1] or [2], in which the ink composition includes a solid content of 12% by mass or greater.

[4] The ink jet recording method described in any one of [1] to [3], in which the ink composition includes a coloring material, a resin emulsion and a water-soluble solvent.

[5] The ink jet recording method described in any one of [1] to [4], in which the ink composition is a white ink composition including titanium oxide.

[6] The ink jet recording method described in any one of [1] to [5], in which recording is performed by performing a plurality of the scannings.

[7] The ink jet recording method described in any one of [1] to [6], in which the recording medium is cloth.

[8] The ink jet recording method described in any one of [1] to [7], in which the recording medium is supported by a recording medium support portion having a surface formed of a resin, from the opposite side of the side opposed to the ink jet head of the recording medium.

[9] The ink jet recording method described in any one of [1] to [8], in which a one-time discharged ink amount of the ink composition which is discharged from one nozzle is 10 ng or less.

[10] The ink jet recording method described in any one of [1] to [9], in which the ink jet head has another nozzle array for discharging another ink composition different from the ink composition on at least one side of the side which is on the opposite side of the second nozzle array, of the first nozzle array and the side which is on the opposite side of the first nozzle array, of the second nozzle array.

[11] An ink jet recording apparatus, in which recording is performed by the ink jet recording method described in any one of [1] to [10].

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment for carrying out the invention (hereinafter, referred to as "the embodiment") will be described in detail with reference to the drawings as necessary. Further, the invention is not limited thereto, and various modifications are possible without departing from the gist of the invention. Moreover, in the drawings, the same reference numerals are given to the same elements, and the overlapping descriptions will not be repeated. In addition, a positional relationship such as upward, downward, leftward and rightward is based on the positional relationship shown in the drawings unless stated otherwise. Moreover, the dimensional ratio of the drawings is not limited to the ratio shown.

Ink Jet Recording Method

In an ink jet recording method of the embodiment, an ink jet head having a first nozzle array and a second nozzle array which is arranged along the first nozzle array, in which a distance L1 between the first nozzle array and the second nozzle array is 15 mm or greater and a nozzle density L2 of the first nozzle array and a nozzle density L2 of the second nozzle array are 600 dpi or greater is used, and while varying the relative position of the ink jet head in a direction intersecting an array direction of the first nozzle array and the second nozzle array with respect to a recording medium, an ink composition is adhered to the recording medium by performing a scanning which discharges the ink composition at a frequency of 12 kHz or greater from nozzles in the first nozzle array and the second nozzle array.

1. Ink Jet Head

Figure 1:
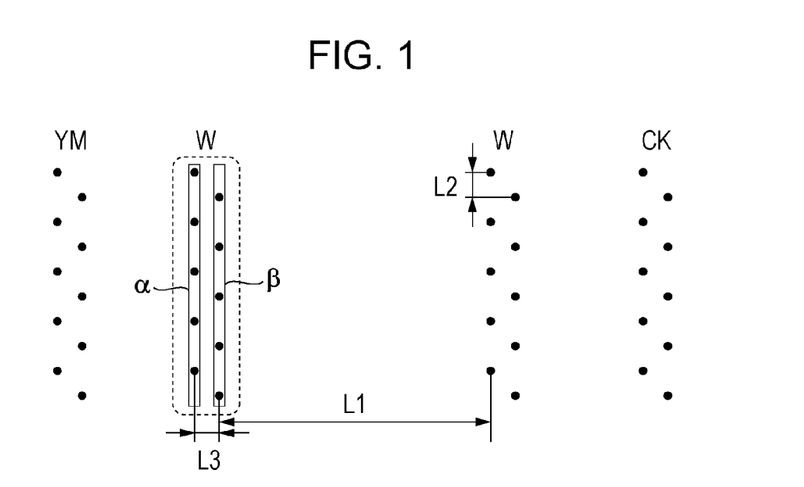
FIG. 1 is a schematic diagram showing an arrangement of a first nozzle array and a second nozzle array.

In the ink jet recording method of the embodiment, the ink jet head having the first nozzle array and the second nozzle array which is arranged along the first nozzle array, in which the distance L1 between the first nozzle array and the second nozzle array is 15 mm or greater, and the nozzle density of the first nozzle array and the nozzle density of the second nozzle array are 600 dpi or greater is used. FIG. 1 is a schematic diagram showing an arrangement of the first nozzle array and the second nozzle array, and each black dot shows the position of a nozzle opening of the nozzle. FIG. 1 is a diagram of when a nozzle plate of the head is viewed from the side of the recording medium and a right and left direction is a scanning direction.

1-1. Distance L1 Between First Nozzle Array and Second Nozzle Array

The distance L1 between the first nozzle array and the second nozzle array is preferably 15 mm or greater, more preferably 18 mm or greater and still more preferably 19 mm or greater. When the distance L1 is set to 15 mm or greater by widening the space between the nozzle arrays to be in the ranges, or by not using a nozzle array between these nozzle arrays, contamination by the adhesion of the ink composition to the nozzle plate is unlikely to occur, and a cleaning frequency is reduced. In addition, a discharging stability of the ink tends to be improved. In addition, the distance L1 between the first nozzle array and the second nozzle array is preferably 100 mm or less, more preferably 50 mm or less, still more preferably 30 mm or less, and particularly preferably 25 mm or less. When the distance L1 is in the above ranges, the head can be further reduced in size.

1-2. Nozzle Density L2

A nozzle density L2 of the first nozzle array and the second nozzle array is preferably 600 dpi or greater, more preferably 720 dpi or greater and still more preferably 1000 dpi or greater. When the nozzle density L2 is in the above range, a concealing property is improved. In addition, the nozzle density of the first nozzle array and the second nozzle array is preferably 2000 dpi or less, and more preferably 1500 dpi or less. When the nozzle density L2 is in the above range, the production cost of the head tends to be further lowered.

In FIG. 1, the nozzle arrays of each color are arranged from the left in the order of Y (yellow), M (magenta), W (white), W (white), C (cyan), and K (black). The first nozzle array (W) and the second nozzle array (W) are not particularly limited as long as the nozzles are arranged side by side, and the nozzles may be arranged in one straight line and the nozzles may be arranged so as to have an array width. As W shown in FIG. 1, the nozzles may also be arranged in a staggered arrangement (portion enclosed by a dashed line in FIG. 1). By arranging the nozzles such that the nozzles have the array width, a wider space in which a pressure chamber communicating with the nozzles is installed can be ensured. Moreover, an array width in the case where the nozzles are arranged so as to have an array width, that is, in FIG. 1, the distance (array width L3) between the lane α and the lane β is preferably 5 mm or less, and more preferably 3 mm or less. The lower limit value of the array width is preferably 1 mm or greater, and more preferably 2 mm or greater. In the case where the nozzle arrays have the array width, the distance L1 between the first nozzle array and the second nozzle array is a distance between the nozzle closest to the second nozzle array in the right and left direction of FIG. 1 among the nozzles of the first nozzle array and the nozzle closest to the first nozzle array in the right and left direction of FIG. 1 among the nozzles of the second nozzle array.

In addition, as shown in FIG. 1, the head preferably has another nozzle array for discharging another ink composition different from the ink composition on at least one side (hereinafter, simply referred to as "the outer side of the first and the second nozzle arrays") of the first nozzle array which is on the opposite side of the second nozzle array and the second nozzle array which is on the opposite side of the first nozzle array. In FIG. 1, the nozzle arrays of color ink compositions of Y, M, C, and K on the outer side of the first and the second nozzle arrays (W) are shown as the other nozzle arrays. The spaces between M and W, and C and W nozzle arrays are preferably ½ or less, and more preferably ⅓ or less of the distance L1. When the space between the first nozzle array and the other nozzle array, or the space between the second nozzle array and the other nozzle array is in the above range, there is a tendency that the head can be further reduced in size.

When there is not the nozzle array for discharging the other ink composition between the first nozzle array and the second nozzle array, in the nozzle plate, there is a tendency that the effect on the nozzles of other colors is small even when a portion which is between the openings of the first nozzle array and the second nozzle array is contaminated with the ink composition of a predetermined color. The other ink composition is an ink of which the composition is different from the ink discharged from the first nozzle array and the second nozzle array, for example, an ink of which the type of a coloring material is different.

2. Scanning Method

In the ink jet recording method of the embodiment, while varying the relative position of the ink jet head in a direction (hereinafter, also referred to as "a main scanning direction") intersecting an array direction of the first nozzle array and the second nozzle array, preferably in a direction perpendicular with respect to the recording medium, a scanning which discharges the ink composition at the frequency of 12 kHz or greater from the nozzles in the first nozzle array and the second nozzle array is performed. The head is preferably a serial printer which performs recording by a plurality (twice or more) of the scannings with respect to the recording medium. In this case, a dot formation density of an image and the amount of the ink of the entire image can be increased, and in the case of using a white ink composition, there is a tendency that the concealing property is more ensured, and in the case of using a color ink composition, there is a tendency that higher colorful image can be obtained. On the other hand, the configuration as a line printer which performs recording by single scanning of the head with respect to the recording medium may be employed.

3. Discharging Method

In the ink jet recording method of the embodiment, the ink composition is discharged from the first nozzle array and the second nozzle array at the frequency of 12 kHz or greater. A discharging frequency is 12 kHz or greater, preferably 20 kHz or greater, more preferably 30 kHz or greater, and still more preferably 40 kHz or greater. When the discharging frequency is in the above range, a printing speed tends to be more excellent. Moreover, the upper limit of the discharging frequency, which is not particularly limited, is preferably 150 kHz or less, more preferably 100 kHz or less and still more preferably 50 kHz or less. When the discharging frequency is in the above range, a drying speed tends to be more excellent. The discharging frequency can be controlled by a discharging mechanism described later.

The amount of one ink droplet of the ink composition discharged at one time which is discharged from one nozzle is preferably 17 ng or less, more preferably 10 ng or less, and still more preferably 9 ng or less. When the amount of the ink is in the above range, the drying speed tends to be more excellent. In addition, the amount of one ink droplet of the ink composition which is discharged from one nozzle is preferably 1 ng or greater, more preferably 3 ng or greater and still more preferably 5 ng or greater. When the amount of the ink is in the above range, dots can be formed at the high dot formation density with an excellent drying speed and an excellent printing speed. The amount of the ink of one drop of the ink composition which is discharged from a nozzle can be controlled by a discharging mechanism described later.

Discharging Mechanism

The ink jet recording apparatus moves the head along the main scanning direction, and discharges ink droplets from the nozzle openings of the head while being interlocked with the movement, thereby recording an image on the recording medium. For example, the discharging of ink droplets is performed by inflating and deflating a pressure generating chamber which communicates with the nozzle openings.

For example, the inflating and deflating of the pressure generating chamber is performed by using the deformation of a piezoelectric transducer. In such a head, the piezoelectric transducer is deformed depending on a driving pulse to be supplied, and by this, the volume of the pressure chamber is changed, and a pressure change is generated in the ink composition in the pressure chamber by the volume change, whereby ink droplets are discharged from the nozzle openings.

In such an ink jet recording apparatus, a driving signal is generated by connecting a plurality of driving pulses in series. On the other hand, print data including the gradation information is transmitted to the head. Then, only the required driving pulse is selected from the driving signal and the selected driving pulse is supplied to the piezoelectric transducer on the basis of the transmitted print data. Thus, the amount of ink droplets discharged from the nozzle openings is changed depending on the gradation information.

More specifically, for example, in an ink jet recording apparatus in which the four gradations formed of non-recording print data, small dot print data, medium dot print data and large dot print data are set, the ink droplets having the different amount of the ink are discharged depending on each gradation.

Figure 2:
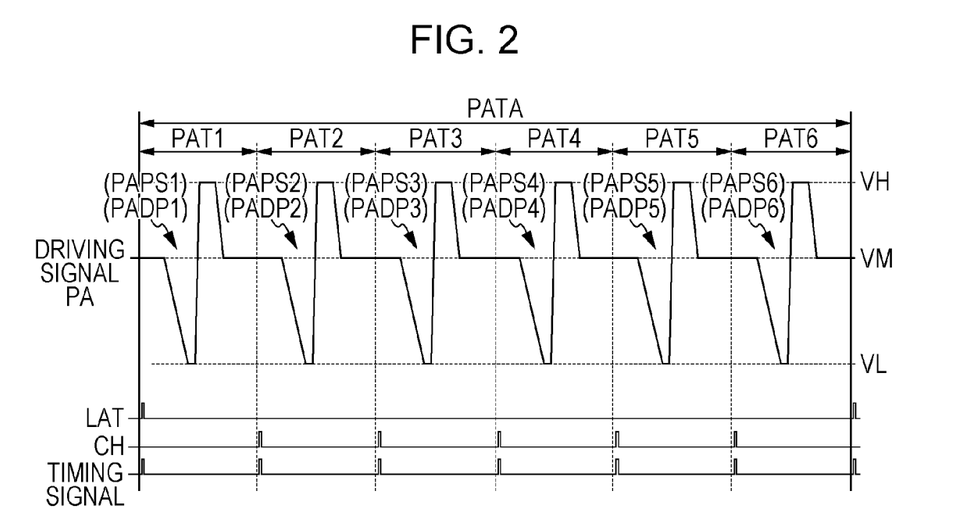
FIG. 2 is a view showing an example of a driving signal.

In order to realize the four gradation recording, for example, a driving signal as shown in FIG. 2 can be used. As shown in FIG. 2, the driving signal connects a first pulse signal PAPS1 which is arranged in the period PAT1, a second pulse signal PAPS2 which is arranged in the period PAT2, a third pulse signal PAPS3 which is arranged in the period PAT3, a fourth pulse signal PAPS4 which is arranged in the period PAT4, a fifth pulse signal PAPS5 which is arranged in the period PAT5 and a sixth pulse signal PAPS6 which is arranged in the period PAT6 in series, and it is a pulse-train waveform signal which is repeatedly generated with a recording period PATA.

In this case, the first pulse signal PAPS1 is the first driving pulse PADP1, the second pulse signal PAPS2 is the second driving pulse PADP2, the third pulse signal PAPS3 is the third driving pulse PADP3, the fourth pulse signal PAPS4 is the fourth driving pulse PADP4, the fifth pulse signal PAPS5 is the fifth driving pulse PADP5 and the sixth pulse signal PAPS6 is the sixth driving pulse PADP6.

These driving pulses PADP1 to PADP6 all have the same waveform and are signals which can independently discharge ink droplets. That is, when the respective driving pulses are supplied to the piezoelectric transducer, the amount of ink droplets capable of forming small dots are discharged from the nozzle openings.

In this case, by increasing and decreasing the number of the driving pulses supplied to the piezoelectric transducer, gradation control can be performed. For example, small dots can be recorded by supplying one driving pulse, medium dots can be recorded by supplying two driving pulses, and large dots can be recorded by supplying three driving pulses.

Here, the medium potential VM shown in FIG. 2 is referred to as a bias voltage. The bias voltage is always supplied to the piezoelectric transducer. In other words, the potential of the piezoelectric transducer is maintained in an intermediate state between the lowest potential VL and the highest potential VH. By keeping such an intermediate state as the state at the time of starting the driving, a volume change can be generated at the inflation side and at the deflation side.

For example, when a driving frequency of one recording cycle is set to 7.2 kHz, a frequency of one driving pulse becomes 43.2 kHz. Accordingly, when six driving pulses are applied to a piezoelectric element in one recording cycle, six ink droplets can be discharged, and discharging frequency in this case becomes 43.2 kHz. In addition, in the case where the driving frequency of one recording cycle is set to 7.2 kHz, when there is an intention to set the discharging frequency to 21.6 kHz, an ink composition may be discharged by applying only three driving pulses to every other out of six driving pulses PAPS to the piezoelectric element. Similarly, when there is an intention to set the discharging frequency to 14.4 kHz, an ink composition may be discharged by applying only two pulses to every two out of six driving pulses to the piezoelectric element.

In addition, the amount of the ink per one ink droplet can be slightly adjusted by adjusting the potential difference between voltage VL and VH. Moreover, one recording cycle corresponds to the recording resolution, and one pixel is recorded in one recording cycle.

4. Adhesion

In the ink jet recording method of the embodiment, an image is formed by a discharged ink composition adhering to the recording medium. After adhering, a heating step which heat-treats the recording medium to which the ink composition adheres may be also included. By the heat treatment, it is possible to fuse a resin (polymer) capable of being included in the ink composition onto the surface of the recording medium, and it is possible for water to evaporate. As a result, a friction resistance tends to be more excellent.

As the heat treatment, which is not limited to the following, a heat press method, a normal pressure steam method, a high pressure steam method, and a thermofix method are exemplified. In addition, as a heat source of heating, which is not limited to the following, an infrared light (lamp) is exemplified. Further, the temperature at the time of heat treatment may be a temperature at which a resin (polymer) capable of being included in an ink composition can be fused and water can evaporate, and it is preferably in the range of about 150° C. to 200° C.

After the heating step, the recording medium may be washed and dried. At this time, a soaping treatment, that is, a treatment of washing off a non-fixed pigment with a heated soap solution may be performed as necessary.

In this manner, it is possible to obtain a recorded material in which an image derived from the ink composition of the embodiment is formed on the recording medium such as cloth. The recorded material has an excellent coloring property since generation of cracks, irregularities and dirt can be prevented, and also has an excellent friction resistance since the fixation (adhesiveness) of the ink composition is excellent.

4-1. Adhered Amount of Ink Composition

The adhered amount of the ink composition with respect to the recording medium is preferably 50 mg/inch$^2$ or greater, more preferably 150 mg/inch$^2$ or greater, and still more preferably 200 mg/inch$^2$ or greater. When the adhered amount is in the above range, the concealing property tends to be more excellent. In addition, the adhered amount is preferably 400 mg/inch$^2$ or less and more preferably 300 mg/inch$^2$ or less. When the adhered amount is in the above range, the printing speed and the drying speed tend to be more excellent.

4-2. Dot Formation Density

"Dot formation density" refers to a formation density of each ink droplet which is discharged on the recording medium, and is represented by the horizontal direction (main scanning direction, a width direction) of the recording medium×the vertical direction of the recording medium (sub-scanning direction, transport direction) (respective dpi). On the other hand, "recording resolution" refers to the density of the minimum recording unit (pixel) capable of controlling the gradation on the basis of the print data. In some cases, the dot formation density is the same as the recording resolution. However, it is not necessarily the same. The dot formation density in the embodiment, which is not particularly limited, can be set in the range of 1440 dpi to 8640 dpi, and in the range of 1440 dpi to 2880 dpi in the main scanning direction and the sub-scanning direction.

5. Recording Medium Support Portion

The recording medium is preferably supported by a recording medium support portion having a surface formed of a resin, from the opposite side of the side opposed to the ink jet head of the recording medium. If the recording medium support portion is a surface formed of a resin, the weight thereof is light, and therefore, it is not necessary for a motor of the support portion transport device to be powerful. In addition, if the support portion is formed of a transparent resin, positioning workability is improved when the recording medium is fixed. In addition, in the case where the surface of the recording medium support portion is formed of a resin, static electricity is likely to be generated due to the friction with the recording medium when the recording medium is set to on the support portion. When the static electricity is generated, mist is likely to be generated. For this reason, in the case of the recording medium support portion having a surface formed of a resin, the need to solve the problem by applying the invention is particularly great.

In addition, the recording medium is also preferably supported by the recording medium support portion having a surface formed of a metal. In the case of using the recording medium support portion having a surface formed of a metal, the generation of mist is reduced, and therefore, contamination by the adhesion of the ink composition to a nozzle plate is suppressed, and the cleaning frequency tends to be more reduced. The reason thereof is assumed to be that when the recording medium is set on the recording medium support portion, both are rubbed against each other, and therefore, static electricity is generated. However, in the case of a surface formed of a metal, even if both are rubbed against each other, static electricity is not generated, and therefore, ink droplets are not hindered from reaching the recording medium by static electricity and the cause of mist generation is not formed. However, the reason thereof is not limited thereto.

6. Printer

Figure 3:
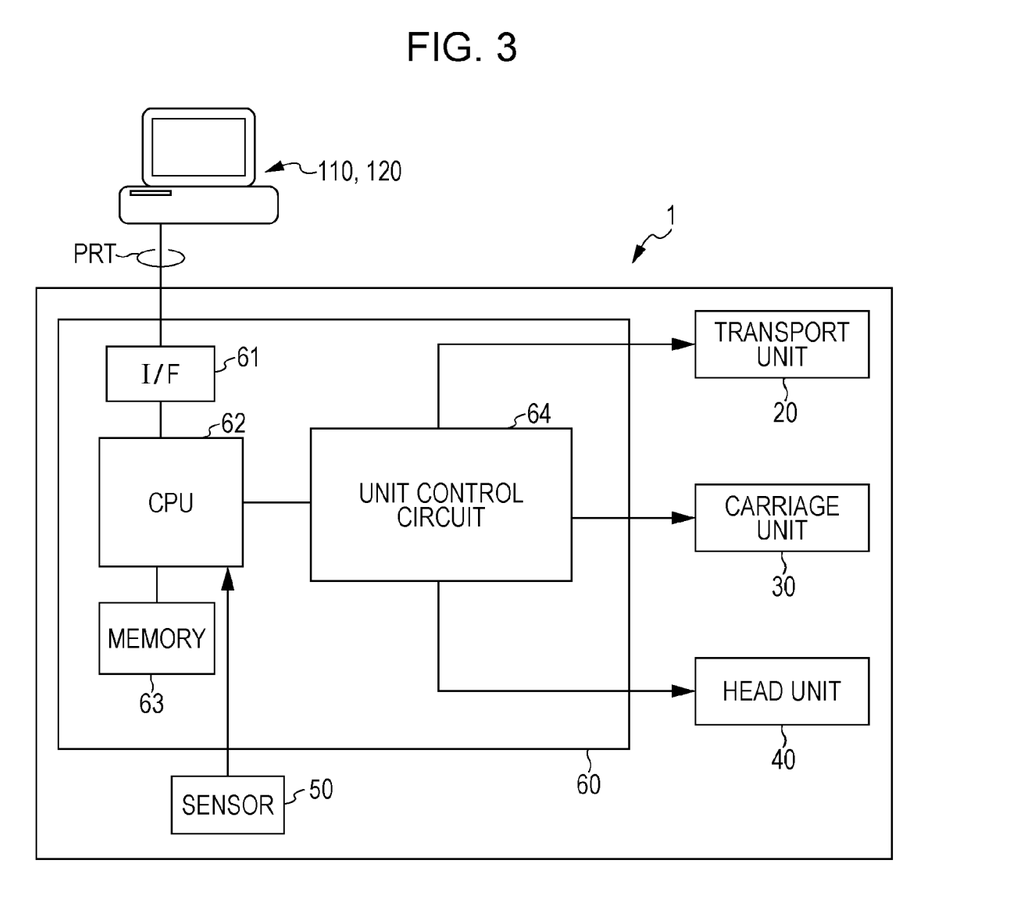
FIG. 3 is an example of a block diagram of an entire constitution of an (entire) ink jet recording apparatus.

FIG. 3 is an example of a block diagram showing an entire constitution of an (entire) ink jet recording apparatus which performs recording by the ink jet recording method of the embodiment. An ink jet printer 1 has a transport unit 20, a carriage unit 30, a head unit 40, a sensor group 50 and a controller 60. The ink jet printer 1 which receives a print signal PRT from a computer 110 having a display device 120 controls respective units by the controller 60 and performs recording on the recording medium. The controller 60 has a unit control circuit 64, a CPU 62, a memory 63 and an interface portion 61. The head unit 40 has the head and the discharging mechanism, and the discharging frequency at the time of recording and the amount of the ink and the like are adjusted by control of the head unit 40 by the controller 60. A carriage unit moves the head along the main scanning direction. A transport unit transports the recording medium in the transport direction.

Ink Composition

As the ink composition used in the embodiment, which is not particularly limited, an aqueous ink and a non-aqueous ink (solvent-based ink and the like) are exemplified. The ink composition, which is not particularly limited, preferably includes a coloring material, a resin emulsion and a water-soluble solvent. Hereinafter, the additives (components) which are included or can be included in the ink composition will be described in detail. Moreover, the ink composition discharged from the first nozzle array and the ink composition discharged from the second nozzle array may be the ink compositions having the same composition (components and content thereof are the same) as each other, or may be the ink compositions having different compositions from each other. In the case of forming an image (for example, white image) using two nozzle arrays, the ink compositions having at least the same kind of a coloring material is preferably used and the inks having the same components is more preferably used.

The ink composition preferably includes a solid content of 7% or more, more preferably includes the solid content of 12% or more, still more preferably includes the solid content of 15% or more and particularly preferably includes the solid content of 16% or more on a mass basis as the lower limit. When the solid content is in the above range, the concealing property of a recorded material tends to be excellent. In addition, the upper limit of the solid content is preferably 40% or less, more preferably 35% or less, still more preferably 30% or less and particularly preferably 25% or less. When the solid content is in the above range, since components which become contaminants by the adhesion is relatively small, contamination by the adhesion of the ink composition to a nozzle plate is unlikely to occur, the cleaning frequency tends to be reduced, and the discharging stability tends to be excellent. The solid content is included in the ink and is not volatilized when the ink is dried. The solid content is components which remain on the recording medium as a solid at room temperature over a long period of time after the ink is dried, and is components excluding water and organic solvents. Mainly, a coloring material, a resin and the like correspond to the solid content.

1. Coloring Material 1-1. White Pigment

The ink composition discharged from the first nozzle array and the second nozzle array preferably includes a white pigment. A white ink composition including a white pigment is recorded as a solid image in order to conceal a dark cloth with a white image and improve the appearance of a color image which is recorded on the white image. At this time, the ink composition is discharged from all the nozzles at a comparatively high discharging frequency so as not to slow down the printing speed. Accordingly, an air curtain is particularly likely to be formed, contamination by the adhesion of a nozzle plate is increased, the number of nozzles which cause a discharge failure (non-discharge and deflection) are increased, and therefore, it is necessary to increase the cleaning frequency of the nozzle. For this reason, in the case of a white pigment constituting the white ink composition, the need to solve the problem by applying the invention is particularly great.

As the white pigment which is included in the white ink composition, which is not limited to the following, white inorganic pigments such as titanium oxide, zinc oxide, zinc sulfide, antimony oxide and zirconium oxide can be exemplified. The white organic pigments such as white hollow resin particles or polymer particles can be also used in addition to the white inorganic pigments.

As a color index (C. I.) of the white pigment, which is not limited to the following, C. I. Pigment White 1 (basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), 23 (gloss white), 24 (alumina white), 25 (plaster), 26 (magnesium oxide and silicon oxide), 27 (silica) and 28 (anhydrous calcium silicate) are exemplified.

Among these, titanium oxides are preferable since the titanium oxides are excellent in the coloring property, the concealing property and dispersion particle diameter and excellent visibility (brightness) can be obtained.

Among the titanium oxides, general rutile type titanium oxide is preferable as the white pigment. As the rutile type titanium oxide, self-produced titanium oxide or commercially available titanium oxide may be used. As an industrial production method in the case where the rutile type titanium oxide (powdery) is self-produced, known methods such as a sulfate method and a chlorine method in the related art can be exemplified.

As a commercially available rutile type titanium oxide, Tipaque (registered trademark) CR-60-2, CR-67, R-980, R-780, R-850, R-980, R-630, R-670, and PF-736 (hereinbefore, product names, all manufactured by ISHIHARA SANGYO KAISHA, LTD.) can be exemplified.

A 50% average particle diameter of titanium oxide (hereinafter, referred to as "D50") is preferably to be in the range of 50 nm to 500 nm, and more preferably in the range of 150 nm to 350 nm. When the D50 is in the range, an image with high image quality can be formed since the friction resistance of a recorded material and the visibility of an image become excellent.

Here, "50% average particle diameter of titanium oxide" in the specification means D50 of titanium oxide which exists in the ink composition, not D50 of titanium oxide before the ink composition is prepared. In addition, the "50% average particle diameter" in the specification means 50% average particle diameter in terms of a sphere determined by a dynamic light scattering method and is a value obtained as follows.

Particles in a dispersion medium are irradiated with a light and the diffraction scattered light being generated is measured by detectors arranged at the front, the lateral and the rear sides of the dispersion medium. It is assumed that a particle which originally has an indeterminate form is spherical, and a cumulative curve is acquired by setting the entire volume of a particle group converted to a sphere having a volume equivalent to that of the particle to 100%, and the point at which cumulative value becomes 50% during that time is set to "50% average particle diameter using a dynamic light scattering method in terms of the sphere."

In the case where titanium oxide is used as the white pigment, the titanium oxide is preferably surface-treated with alumina silica in order to suppress photocatalysis. The amount of the surface treatment (amount of alumina silica) at the time may be in the range of about 5% by mass to 20% by mass with respect to the total mass (100% by mass) of the white pigment which is surface-treated.

Furthermore, the content of the white pigment, which varies depending on the kind of a pigment being used, is preferably in the range of 1% by mass to 30% by mass, and more preferably in the range of 1% by mass to 15% by mass with respect to the total mass (100% by mass) of the ink composition from the viewpoint of ensuring an excellent coloring property. Among these, since it is difficult for the titanium oxide to precipitate and the titanium oxide has an excellent concealing property and color reproducibility particularly on the cloth with low brightness, the content of the titanium oxide is preferably in the range of 1% by mass to 20% by mass, and more preferably in the range of 5% by mass to 13% by mass with respect to the total mass (100% by mass) of the ink composition. Each white pigment may be used alone, or two or more kinds may be used in combination.

1-2. Other Coloring Materials

In the ink composition used in the embodiment, coloring materials other than those exemplified below can also be used without being particularly limited. As carbon blacks, which are not particularly limited, furnace black, lamp black, acetylene black and channel black (C. I. Pigment Black 7) can be exemplified. Furthermore, as commercially available carbon blacks, No. 2300, 900, MCF88, No. 20B, No. 33, No. 40, No. 45, No. 52, MA7, MA8, MA100, No. 2200B (hereinbefore, product names, all manufactured by Mitsubishi Chemical Corporation), Color Black FW1, FW2, FW2V, FW18, FW200, S150, S160, S170, Printex 35, U, V, 140U, Special Black 6, 5, 4A, 4, 250 (hereinbefore, product names, all manufactured by Degussa AG), Conductex SC, Raven 1255, 5750, 5250, 5000, 3500, 1255, 700 (hereinbefore, product names, all manufactured by Columbian Carbon Japan Ltd.), Regal 400R, 330R, 660R, Mogul L, Monarch 700, 800, 880, 900, 1000, 1100, 1300, 1400, and Elftex 12 (hereinbefore, product names, all manufactured by Cabot Corporation) are exemplified. The inorganic pigments may each be used alone, or two or more kinds may be used in combination.

As organic pigments, which are not particularly limited, quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigment, perynone pigments, quinophthalone pigments, anthraquinone pigments, thioindigo pigments, benzimidazolone pigments, isoindolinone pigments, azomethine pigments and azo pigments are exemplified. Specific examples of the organic pigments include the following.

As the pigments used in a cyan ink, C. I. Pigment Blue 1, 2, 3, 15, 15:1, 15:2, 15:3, 15:4, 15:6, 15:34, 16, 18, 22, 60, 65, 66, C. I. Vat Blue 4, 60 and the like are exemplified. Among these, at least one of C. I. Pigment Blue 15:3 and 15:4 is preferable.

As the pigments used in a magenta ink, C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, C. I. Pigment Violet 19, 23, 32, 33, 36, 38, 43, 50 and the like are exemplified. Among these, one or more types selected from the group formed of C. I. Pigment Red 122, C. I. Pigment Red 202 and C. I. Pigment Violet 19 are preferable.

As the pigments used in a yellow ink, C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, 213 and the like are exemplified. Among these, one or more types selected from the group formed of C. I. Pigment Yellow 74, 155 and 213 are preferable.

Moreover, as pigments used in inks having colors other than those described above, that is, inks such as a green ink or an orange ink, known pigments in the related art are exemplified. The pigment may be also a clear ink not including a coloring material.

2. Pigment Dispersion

The pigment may be present as a state in which the pigment is dispersed in the ink composition, that is, a pigment dispersion. Here, the pigment dispersion in the specification includes a pigment dispersing liquid and a pigment slurry (low-viscosity aqueous dispersion).

D50 of dispersion of a white pigment is preferably in the range of 100 nm to 600 nm and more preferably in the range of 200 nm to 500 nm. When the D50 is 100 nm or greater, both the concealing property and the coloring property become excellent. When the D50 is 1 μm or less, both fixation of the ink and the discharging stability of the ink become excellent.

As the pigment dispersions, which are not limited to the following, a self-dispersing type pigment and a polymer-dispersing type pigment are exemplified.

2-1. Self-Dispersing Type Pigment

The self-dispersing type pigment is a pigment which can be dispersed or dissolved in an aqueous medium without a dispersant. Here, "disperse or dissolve in an aqueous medium without a dispersant" refers to a state where the pigment is stably present in an aqueous medium due to a hydrophilic group on the surface even if a dispersant for dispersing the pigment is not used. For this reason, an ink in which foaming resulting from deterioration of a defoaming property caused by the dispersant practically does not occur, and which has an excellent discharging stability is easily prepared. In addition, since significant increase in the viscosity caused by the dispersant is sufficiently suppressed, more pigment can be contained, print density can be sufficiently increased, and therefore handling is easy.

The hydrophilic group is preferably a hydrophilic group of one or more types selected from the group formed of —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$ and —$NR_3$.

Moreover, in these chemical formulas, M represents a hydrogen atom, an alkali metal, ammonium, a phenyl group which may have a substituent or an organic ammonium, and R represents an alkyl group having 1 to 12 carbon atoms or a naphthyl group which may have a substituent. In addition, M and R are respectively selected independently of each other.

For example, the self-dispersing type pigment is produced by bonding (grafting) the hydrophilic group to the pigment surface by means of performing physical or chemical treatment to the pigment. As the physical treatment, a vacuum plasma treatment and the like are exemplified. In addition, as the chemical treatment, a wet oxidation method in which the pigment surface is oxidized by an oxidant in water and a method of bonding a carboxyl group via a phenyl group by means of bonding p-aminobenzoic acid to the pigment surface and the like are exemplified.

2-2. Polymer-Dispersing Type Pigment

The polymer-dispersing type pigment is a pigment which is dispersed by a polymer dispersion. As the polymers used in the polymer-dispersing type pigment, which are not limited to the following, the glass transition temperature ($T_g$) of the dispersion polymer used in the dispersion of the pigment is preferably 55° C. or lower, and more preferably 50° C. or lower. When the $T_g$ is 55° C. or lower, the fixation of the ink can become excellent.

In addition, the weight average molecular weight of the polymers measured by gel permeation chromatography (GPC) is preferably in the range of 10,000 to 200,000. Accordingly, the storage stability of the ink is further improved. Here, the weight average molecular weight (Mw) in the specification can be measured as the weight average molecular weight in terms of polystyrene by a gel permeation chromatography (GPC) of an L7100 system manufactured by Hitachi Ltd.

As the polymers, 70% by mass or greater of the components thereof is preferably the polymer resulted from copolymerization of (meth)acrylate and (meth)acrylic acid since fixation and glossiness of the ink are more excellent. At least one of alkyl (meth)acrylate having 1 to 24 carbon atoms and cyclic alkyl (meth)acrylate having 3 to 24 carbon atoms is preferably polymerized from monomer components of 70% by weight or more. As specific examples of the monomer components, which are not limited to the following, methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butyl cyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate and behenyl (meth)acrylate are exemplified. In addition, as the other monomer components for polymerization, hydroxy (meth)acrylate, urethane (meth)acrylate and epoxy (meth)acrylate which have a hydroxyl group such as hydroxyethyl (meth)acrylate, hydroxypropyl (meth)acrylate and diethylene glycol (meth)acrylate can also be used.

2-3. Pigment Coated with Polymer

In addition, a pigment coated with the polymer among the polymer-dispersing type pigments, that is, a micro-encapsulated pigment, is suitably used since the fixation, the glossiness and the color reproducibility of the ink are excellent.

The pigment coated with the polymer is obtained by a phase inversion emulsification method. In other words, the polymer is dissolved in organic solvents such as methanol, ethanol, isopropanol, n-butanol, acetone, methyl ethyl ketone, and dibutyl ether. The pigment is added to the obtained solution, a neutralizing agent and water are added, and a dispersion of an oil-in-water type is adjusted by performing a kneading and dispersing treatment. Then, the pigment which is coated with a polymer as a water dispersion can be obtained by removing the organic solvent from the obtained dispersion. For example, a ball mill, a roll mill, a bead mill, a high pressure homogenizer and a high-speed stirring type disperser and the like can be used in the kneading and dispersal treatment.

As the neutralizing agents, ethylamine, tertiary amines such as trimethylamine, lithium hydroxide, sodium hydroxide, potassium hydroxide and ammonia and the like are preferable. The pH of the obtained aqueous dispersion is preferably in the range of 6 to 10.

As the polymer which coats the pigment, polymers having the weight average molecular weight in the range of about 10,000 to 150,000 measured by GPC are preferable from the viewpoint of stably dispersing the pigment.

Among the pigments which are coated with a polymer, a color pigment which is coated with a polymer is preferable. The coloring property of a recorded material becomes excellent by using the color pigment.

3. Resin Emulsion

The ink composition used in the embodiment preferably further includes a resin emulsion. The resin emulsion can make the friction resistance and the washing fastness of the image portion of the recorded material be more excellent since when the ink is dried, resins to each other, and a resin and a pigment are fused together, respectively, and the pigment is fixed on the recording medium. Among the resin emulsions, a urethane resin emulsion and an acrylic resin emulsion are preferable, and a urethane resin emulsion is more preferable. Thus, since the fixation of the ink becomes excellent, both the friction resistance and the washing fastness of the recorded material become excellent.

In the case where the resin emulsion is included in the ink composition, the resin emulsion sufficiently fixes the ink composition on the recording medium by forming a resin film on the recording medium and thus, the friction resistance of the recorded material becomes excellent. For this reason, the resin emulsion is preferably a thermoplastic resin. In particular, desired physical properties of the film are easily obtained since a urethane resin emulsion has a high flexibility of design.

The urethane resin emulsion is an resin emulsion which has a urethane bond in a molecule. Further, as the urethane resin emulsions, a polyether type urethane resin including an ether bond in a main chain, a polyester type urethane resin including an ester bond in the main chain, and a polycarbonate type urethane resin including a carbonate bond in the main chain can be used in addition to the urethane bond. As acrylic resin emulsions, those obtained by polymerizing a (meth)acrylic monomer such as (meth)acrylic acid and (meth)acrylic acid ester, and those obtained by copolymerizing a (meth)acrylic monomer and other monomers are exemplified.

Hereinafter, preferred physical properties of the resin emulsion will be described. First, in the temperature range (15° C. to 35° C.) in which an ink jet recording is generally performed, since it is preferable that the resin emulsion have a film-forming property, the $T_g$ is preferably 0° C. or lower, more preferably −10° C. or lower and still more preferably −15° C. or lower. In the case where the $T_g$ of the resin emulsion is in the above range, the fixation of the ink which adheres to the recorded material becomes more excellent, and therefore, the friction resistance of the recorded material becomes more excellent. Moreover, the lower limit of the $T_g$, which is not particularly limited, is preferably −70° C. or higher, and more preferably −50° C. or higher.

Furthermore, the acid value of the resin emulsion is preferably in the range of 10 mg KOH/g to 100 mg KOH/g and more preferably in the range of 15 mg KOH/g to 50 mg KOH/g. When the acid value is 100 mg KOH/g or lower, the excellent washing fastness of a recorded material can maintained. In addition, when the acid value is 10 mg KOH/g or greater, the storage stability of the ink, the coloring property and the fixation of the ink on the recording medium become excellent. Moreover, the acid value in the specification is measured using AT610 manufactured by Kyoto Electronics Manufacturing Co., Ltd., and the values calculated by applying numeric values to the following formula are adopted.

Acid value (mg/g)=$(EP1-BL1) \times FA1 \times C1 \times K1$/SIZE

In the formula, EP1 represents a titration amount (mL), BL1 represents a blank value (0.0 mL), FA1 represents a factor of titrant (1.00), C1 represents a concentration conversion value (5.611 mg/mL) (amount corresponding to 1 mL KOH having a concentration of 0.1 mol/L), K1 represents a coefficient (1), and SIZE represents the amount of a sample (g).

In addition, since the resin emulsion prevents cracking and breaking of an image, that is, an ink layer with respect to cloth that easily expands or contracts even in the recording medium, and the washing fastness and the friction resistance of the recorded material become excellent, the elongation at a break is preferably in the range of 500% to 1200%, more preferably in the range of 600% to 1200%, and particularly preferably in the range of 700% to 1200%, and the elastic modulus is preferably in the range of 20 MPa to 400 MPa.

Here, after preparing a film having a thickness of about 60 μm, the elongation at the break in the specification can be measured under the conditions of a tensile test gauge length of 20 mm and a tensile speed of 100 mm/min. In addition, in a measurement of the elastic modulus in the specification, after preparing a film having a thickness of about 60 μm and forming a dumbbell specimen having a parallel portion width of 10 mm and a length of 40 mm, a tensile elastic modulus can be measured by performing a tensile test based on JIS K7161: 1994.

Moreover, to be more specific, the JIS K7161:1994 corresponds to the international standard ISO 527-1:1993, the title thereof is a test method for the plastic-tensile property, and the standard defines the general principles for measuring the tensile property of a plastic and a plastic composite under the predetermined conditions.

D50 of the resin emulsion is preferably in the range of 30 nm to 300 nm, and more preferably in the range of 80 nm to 300 nm. When D50 is in the above range, the resin emulsion particles in the ink composition can be uniformly dispersed. In addition, the lower limit value of D50 is more preferably 100 nm since the friction resistance of a recorded material becomes more excellent.

From the viewpoint of the physical properties of the resin emulsion described above, as commercially available products of the urethane resin emulsion described above, which are not limited to the following, Suncure 2710 (product name, manufactured by The Lubrizol Corp.), Permarin UA-150 (product name, manufactured by Sanyo Chemical Industries, Ltd.), Superflex 460, 470, 610, 700 (hereinbefore, product names, all manufactured by Dai-ichi Kogyo Seiyaku Co., Ltd.), NeoRez R-9660, R-9637, R-940 (hereinbefore, product names, all manufactured by Kusumoto Chemicals, Ltd.), Adeka Bontighter HUX-380, 290K (hereinbefore, product names, all manufactured by Adeka Co., Ltd.), Takelac (registered trademark) W-605, W-635, WS-6021 (hereinbefore, product names, all manufactured by Mitsui Chemicals, Inc.), Polyether (product name, manufactured by Taisei Finechemical Co., Ltd., $T_g$=20° C.) are preferably exemplified.

The urethane resin emulsion may be used alone or two or more kinds may be used in combination.

In addition, the ink composition used in the embodiment preferably includes resin emulsions other than the urethane resin emulsion. Among the resin emulsions, an anionic resin emulsion is preferable since the anionic resin emulsion can effectively prevent a resin from aggregating. As the anionic resin emulsions, which are not limited to the following, a homopolymer or a copolymer of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinylpyrrolidone, vinyl pyridine, vinylcarbazole, vinyl imidazole, vinylidene chloride, a fluororesin and a natural resin are exemplified. Among these, at least one of a (meth)acrylic resin and a styrene-(meth)acrylic acid copolymer resin is preferable, at least one of an acrylic resin and a styrene-acrylic acid copolymer resin is more preferable and a styrene-acrylic acid copolymer resin is further more preferable. Moreover, the copolymers may be any form of a random copolymer, a block copolymer, an alternating copolymer and a graft copolymer.

As resin emulsions other than the urethane resin emulsion, those obtained by materials and preparing method known may be also used, and commercially available products may be also used. As the commercially available products, which are not limited to the following, Mowinyl 966A (product name, manufactured by Nippon Synthetic Chemicals Industry Co., Ltd., acrylic resin emulsion), Microgel E-1002, Microgel E-5002 (hereinbefore, product names, both manufactured by Nippon Paint Co., Ltd.), Voncoat 4001, Voncoat 5454 (hereinbefore, product names, both manufactured by DIC Corp.), SAE1014 (product name, manufactured by Nippon Zeon Corp.), Saibinol SK-200 (product name, manufactured by (SAIDEN CHEMICAL INDUSTRY CO., LTD.)), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, JONCRYL 7610 (hereinbefore, product names, all manufactured by BASF Corp.), and NK binder R-5HN (product name, manufactured by Shin-Nakamura Chemical Co., acrylic resin emulsion, 44% solid content) are exemplified. Among these, Mowinyl 966A which is an acrylic resin emulsion is preferable since Mowinyl 966A sufficiently satisfies desirable physical properties of the resin emulsion described above.

The resin emulsion may be used alone or two or more kinds may be used in combination.

The content of the resin in the resin emulsion is preferably in the range of 3% by mass to 15% by mass, more preferably in the range of 7% by mass to 14% by mass and still more preferably in the range of 8% by mass to 13% by mass with respect to the total mass (100% by mass) of the ink composition. When the content is in the above range, the washing fastness and the friction resistance of a recorded material tend to become excellent, the long-term storage stability of the ink composition is excellent and particularly, there is a tendency that the viscosity of the ink composition can be lowered.

4. Cyclic Amide Compound

The ink composition used in the embodiment preferably further includes a cyclic amide compound. The cyclic amide compound has a function for improving the solubility of a lactic acid ester compound in water. Therefore, since when the ink composition also includes a cyclic amide compound together with the lactic acid ester compound, a solubility of a urethane resin (emulsion) increases and the deposition of foreign materials as described above can be more effectively prevented, and the storage stability, particularly, the storage stability at high temperatures becomes more excellent.

In addition, since the cyclic amide compound also has the moisture retaining function, the cyclic amide compound can prevent aggregation and solidification caused by evaporation of water in a urethane resin (emulsion), other resins (polymer) and a pigment during a storage of an ink. Thus, clogging near the nozzle of a head during an ink jet recording can be prevented and the discharging stability of the ink composition becomes excellent.

As specific examples of the cyclic amide compound, which are not limited to the following, 2-pyrrolidone, N-methyl-2-pyrrolidone and N-ethyl-2-pyrrolidone are exemplified. Among these, 2-pyrrolidone is preferable since a solubility with respect to a resin (polymer) is strengthened further and the storage stability, particularly, the storage stability at high temperatures becomes even more excellent.

The cyclic amide compound may be used alone or two or more kinds may be used in combination.

The content of the cyclic amide compound is preferably in the range of 0.5% by mass to 5% by mass, and more preferably in the range of 1% by mass to 3% by mass with respect to the total mass (100% by mass) of an ink composition. When the content is in the above range, the friction resistance and the washing fastness of the recorded material caused by the long-term storage stability of the ink, the discharging stability of the ink, and the excellent fixation of the ink become more excellent.

5. Water-Soluble Solvent

The ink composition used in the embodiment can include a water-soluble solvent and preferably includes water. As the aqueous solvents, water and water-soluble organic solvents are exemplified. As water, which is not particularly limited, pure water such as ion exchange water, ultrafiltration water, reverse osmosis water and distilled water or ultrapure water can be used. The content of the water, which is not particularly limited, may be suitably determined as necessary, and may be preferably in the range of 20% by mass to 80% by mass with respect to the total mass (100% by mass) of the ink composition in order to adjust the viscosity of the ink composition to be in the suitable range.

Moreover, to avoid duplication, various additives (components) which will be described below do not include the cyclic amide compounds.

6. Penetrating Agent

Since the ink composition used in the embodiment further promotes the aqueous solvent which is a component thereof penetrating into the recording medium, the ink composition may further contain a penetrating agent. A recorded material in which bleeding is small can be obtained by fast penetration of the aqueous solvent into the recording medium.

As the penetrating agents, alkyl ethers (glycol ethers) of polyhydric alcohols and 1,2-alkyldiols are preferably exemplified. As the glycol ethers, which are not limited to the following, ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether and dipropylene glycol monobutyl ether are exemplified. In addition, as the 1,2-alkyldiols, which are not limited to the following, 1,2-pentanediol and 1,2-hexanediol are exemplified. In addition to these, diols having a straight-chain hydrocarbon such as 1,3-propanediol, 1,4-butanediol, 1,5-pentanediol, 1,6-hexanediol, 1,7-heptanediol and 1,8-octanediol can also be exemplified.

The penetrating agent may be used alone or two or more kinds may be used in combination.

The content of the penetrating agent is preferably in the range of 0.1% by mass to 20% by mass, and more preferably in the range of 0.5% by mass to 10% by mass with respect to the total mass (100% by mass) of an ink composition. When the content is 0.1% by mass or more, the penetration into the recording medium of the ink composition can be increased. In contrast, when the content is 20% by mass or less, generation of bleeding in the image can be prevented, and the viscosity of the ink composition can be made to be high.

7. Moisturizing Agent

The ink composition used in the embodiment may further include a moisturizing agent (wetting agent). The moisturizing agent can be used without being particularly limited as long as it is generally used in the ink jet ink. A moisturizing agent having a high boiling point of which the boiling point is preferably 180° C. or higher, and more preferably 200° C. or higher may be used. In the case where the boiling point is in the above range, an excellent water holding property and a wetting property can be applied to the ink composition.

As specific examples of the moisturizing agent having a high boiling point, which are not limited to the following, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a number average molecular weight of 2000 or less, 1,3-propylene glycol, isopropylene glycol, isobutylene glycol, glycerin, meso-erythritol and pentaerythritol are exemplified.

The moisturizing agent may be used alone or two or more kinds may be used in combination. When the ink composition includes the moisturizing agent having a high boiling point, it is possible to obtain the ink composition which can maintain the fluidity and the redispersibility for a long period of time even if the ink composition is left in a state where the pigment ink is exposed to air in an open state. Furthermore, in such an ink composition, since the clogging of the nozzle is unlikely to occur while printing is performed using the ink jet recording apparatus or at the time of being restarted after an interruption, the discharging stability of the ink composition becomes excellent. The content of the moisturizing agent is not particularly limited and may be suitably determined as necessary.

Moreover, as described above, in the case where the ink composition includes a cyclic amide compound, since the cyclic amide compound has a moisture retaining performance, the cyclic amide compound can be used as the moisturizing agent.

8. Surfactant

The ink composition used in the embodiment may include a surfactant. As the surfactants, at least one of an acetylene glycol-based surfactant, an acetylene alcohol-based surfactant and a polysiloxane-based surfactant is preferable. When the ink composition includes these surfactants, the drying property of the ink composition adhering to a recording medium becomes more excellent, and high-speed printing becomes possible.

Among these, polysiloxane-based surfactants are more preferable since the solubility in the ink is increased and foreign matter is less likely to be generated.

As the acetylene glycol-based surfactants and the acetylene alcohol-based surfactants, which are not limited to the following, one or more kinds selected from 2,4,7,9-tetramethyl-5-decyne-4,7-diol and alkylene oxide adducts of 2,4,7, 9-tetramethyl-5-decyne-4,7-diol, and 2,4-dimethyl-5-decyne-4-ol and alkylene oxide adducts of 2,4-dimethyl-5-decyn-4-ol are preferable. These can be available as commercially available products such as E series (product name, manufactured by Air Products Japan, Inc.) of Olfine 104 series and Olfine E1010, Surfynol 465 and Surfynol 61 (product names, manufactured by Nissin Chemical Industry Co., Ltd.).

In addition, as the polysiloxane-based surfactants, BYK-347, BYK-348 (product names, manufactured by BYK Japan KK) are exemplified.

The content of the surfactant is preferably in the range of 0.1% by mass to 3% by mass with respect to the total mass (100% by mass) of the ink composition.

9. Other Components

In the ink composition used in the embodiment, various additives such as a moisturizing agent, a solubilizer, a seepage control agent, a viscosity modifier, a pH adjusting agent, a dissolution aid, an antioxidant, a preservative, an antifungal agent, a corrosion inhibitor and a chelating agent for capturing metal ions which affect dispersion can be suitably added in order to maintain an excellent storage stability thereof and an excellent discharge stability from the head, to improve anti-clogging performance or to prevent deterioration of the ink. The ink composition used in the embodiment is preferably an aqueous ink composition which includes mostly water among the volatile components from the viewpoint of safety.

Recording Medium

Next, the recording medium of the embodiment will be described. The recording medium used in the recording method according to the embodiment, which is not particularly limited, is cloth and paper. As the cloth, which is not particularly limited to the following, natural fibers or synthetic fibers such as silk, cotton, wool, nylon, polyester and rayon are exemplified. Among these, cotton is preferable since cotton can endure fixing of the ink composition at high temperatures.

In the case where the recording medium is cloth, since ink droplets are temporarily trapped by fluff of the cloth surface, it is impossible to reach the cloth surface and, after that, the trapped ink droplets may be located away from the cloth and become mist which is floating in the air. Accordingly, mist is likely to be generated compared to a case with a recording medium such as paper. For this reason, in the case of cloth, the need to solve the problem by applying the invention is particularly great.

Ink Jet Recording Apparatus

The ink jet recording apparatus of the embodiment is not particularly limited as long as recording is performed by the ink jet recording method, and may have the same configuration as those in the related art as long as it has the configuration described above.

EXAMPLES

Hereinafter, the invention will be more specifically described using Examples and Comparative Examples. The invention is not limited to these Examples.

1. Material for Ink Composition

The main material for the ink composition used in the following Examples and Comparative Examples are as follows.

Coloring Material
    Titanium dioxide (manufactured by C. I. Kasei Co., Ltd., product name: Nano tek slurry, 15% titanium oxide solid content concentration, 250 nm average particle diameter)

Resin Emulsion
    Takelac WS-6021 (product name, manufactured by Mitsui Chemicals Polyurethanes, Inc., 30% solid content, urethane resin)

Dispersant
    DEMOL NL (product name, manufactured by Kao Chemical Co., 41% solid content)

Organic Solvent
    Glycerin
    Triethylene glycol
    Triethylene glycol monobutyl ether Silicone-Based Surfactant
    BYK-348 (product name, manufactured by BYK Co., Ltd.)

2. Preparation of White Ink

By mixing according to the composition (% by mass) shown in Table 1 described below and sufficiently stirring, ink compositions 1 and 2 were obtained. In Table 1, the values of Takelac WS-6021 and a dispersant DEMOL NL are the used amounts including the solvent component other than the solid content, the value of titanium dioxide is the amount of the solid content, and the value of the solid content (%) is the amount of solid content in the ink.

TABLE 1

|  | Example 1 | Example 2 | Example 3 | Example 4 | Example 5 | Example 6 | Example 7 |
|---|---|---|---|---|---|---|---|
| Ink composition | 1 | 1 | 1 | 1 | 1 | 1 | 2 |
| Distance between nozzle arrays mm | 19.5 | 19.5 | 19.5 | 19.5 | 19.5 | 19.5 | 19.5 |
| Amount of the ink of ink droplet ng | 7 | 14 | 7 | 7 | 7 | 9 | 7 |
| Nozzle density dpi | 720 | 720 | 720 | 720 | 720 | 720 | 720 |
| Discharging frequency kHz | 43.2 | 21.6 | 43.2 | 43.2 | 14.4 | 43.2 | 43.2 |
| Recording medium | Cloth | Cloth | Normal paper | Cloth | Cloth | Cloth | Cloth |
| Recording medium support portion material | Acryl plate | Acryl plate | Acryl plate | Aluminum | Acryl plate | Acryl plate | Acryl plate |
| Dot formation density dpi | 8640 × 1440 | 4320 × 1440 | 8640 × 1440 | 8640 × 1440 | 2880 × 1440 | 8640 × 1440 | 8640 × 1440 |
| Adhered amount of the ink mg/inch$^2$ | 174 | 174 | 174 | 174 | 58 | 224 | 174 |

TABLE 1-continued

|  | Example 1 | Example 2 | Example 3 | Example 4 | Example 5 | Example 6 | Example 7 |
|---|---|---|---|---|---|---|---|
| Contamination by adhesion of ink onto nozzle plate | B | A | A | A | A | B | A |
| Cleaning frequency | B | A | A | A | A | B | A |
| Concealing property of image | B | B | B | B | C | A | C |
| Printing speed | B | B | B | B | B | B | B |
| Drying speed | B | D | B | B | B | B | B |

3. Recording Medium

As the recording medium, T-shirt cloth (heavyweight black texture manufactured by HANES Inc.) of 100% cotton and normal paper (Xerox P) were used.

4. Ink Jet Recording Apparatus

A printer GS6000 (manufactured by Seiko Epson Corporation) which was remodeled was used (hereinafter, referred to as "remodeled GS6000 printer"). The remodeled portions include a head described below, a discharging mechanism and a recording medium support portion material.

The head in which a first nozzle array and a second nozzle array have the nozzles which have rows aligned in a staggered arrangement as shown in FIG. 1 was prepared. Specifically, (1) heads of which the distance L1 between nozzle arrays was set to 19.5 mm and the nozzle density L2 was set to 720 dpi, (2) heads of which the distance L1 between nozzle arrays was set to 12 mm and the nozzle density L2 was set to 720 dpi, (3) heads of which the distance L1 between nozzle arrays was set to 19.5 mm and the nozzle density L2 was set to 360 dpi, and (4) heads of which the distance L1 between nozzle arrays was set to 12 mm and the nozzle density L2 was set to 360 dpi, respectively, were prepared. In the head of which the nozzle density was set to 360 dpi, since the nozzle array was constructed so as to use every other nozzle in the nozzle array with the nozzle density L2 of 720 dpi, the number of nozzles (the number of nozzles being used) became half, the number of nozzles of (1) and (2) was set to 720 and the number of nozzles of (3) and (4) was set to 360, and the length of the nozzle array in the direction of the nozzle array was set to be the same in (1) to (4).

The discharging mechanism which can control the discharging frequency with the driving frequency of one recording cycle of 7.2 kHz and the driving pulse frequency of 43.2 kHz, and can adjust the amount of the ink per one ink droplet to be in the range of 7 ng to 14 ng by adjusting the potential difference between a voltage VL and a voltage VH was prepared. However, in the case where the amount of the ink per one ink droplet is 14 ng, since the amount of the ink per one ink droplet is large, the adjustment was performed by preparing other heads having a larger nozzle diameter and a larger volume of a pressure chamber. Specific control of the discharging frequency was performed as follows. In the case where the discharging frequency is 21.6 kHz, the discharge was performed by applying only three driving pulses to every other of six driving pulses PAPS to the piezoelectric element, and in the case where the discharging frequency is 14.4 kHz, the discharge was performed by applying only two pulses to every two out of six driving pulses to the piezoelectric element, and in the case where the discharging frequency is 7.2 kHz, the discharge was performed by applying only one pulse to every five out of six driving pulses to the piezoelectric element.

The recording medium support portion material of which the surface material is an acrylic plate and an aluminum plate was prepared.

6. Ink Jet Recording Method Examples 1 to 7 and Comparative Examples 1 to 10

The ink composition 1 or 2 which was prepared as described above adhered to the recording medium using the remodeled GS6000 printer by an ink jet method. More specifically, the ink composition was discharged at a predetermined discharging frequency and a predetermined amount of the ink from the first nozzle array and the second nozzle array, and the ink composition was adhered to the recording medium. The dot formation density was set to a predetermined value and a solid pattern image was recorded on a recording medium of A4 size. The discharging frequency, the amount of the ink and the dot formation density are as shown in Tables 2 and 3.

Moreover, the term "solid pattern image" in the specification means an image on a recording medium in which dots are recorded with respect to an entire pixel of a pixel which is a minimum recording unit area defined by a recording resolution.

The cloth onto which the ink composition 1 or 2 was adhered was heat-treated at 160° C. for 1 minute using a heat press machine to fix the ink composition 1 or 2 on the cloth. In this manner, a recorded material in which an image was formed (ink was printed) on the cloth was prepared. At this time, the following evaluation was performed with respect to the obtained recorded material.

7. Evaluation Item

Adhered Amount of Ink (Mg/Inch$^2$)

The adhered amount of the ink was obtained from the dot formation density by the following formula. Moreover, "×2" is in the formula below because the same amount of the ink was adhered by the first nozzle array and the second nozzle array, respectively. In other words, in the case where the dot formation position by the first nozzle array and the dot formation position by the second nozzle array on the recording medium, and the adhered amount of the ink from each of the first nozzle array and the second nozzle array were set to exactly the same, the dot formation by the first nozzle array, and the entire dot formation by the first nozzle array and the second nozzle array were compared, the dot formation density was the same, and the adhered amount of the ink of the latter was doubled with respect to the former.

Adhered amount of the ink (mg/inch$^2$)=amount of the ink of ink droplet (ng)×dot formation density in the horizontal direction (dpi)×dot formation density in the vertical direction (dpi)×2×10$^{-6}$.

Contamination by Adhesion of Ink onto Nozzle Plate

With the ink composition 1 or 2 shown in Table 1, a solid image of 20 cm×20 cm was printed on T-shirt cloth (heavyweight black texture manufactured by HANES Inc.) of 100% cotton which was set to the size of about A4 size, using the remodeled GS6000 printer. The contamination by the ink between two nozzle arrays on a nozzle plate after 50 sheets were printed was visually observed. The evaluation criteria of contamination by adhesion of the ink onto the nozzle plate are shown below. Moreover, in all examples, the contamination by the ink was rarely observed on the outer side of the first and second nozzle arrays.

Evaluation Criteria
A: Contamination of a nozzle was not observed.
B: Slight adhesion of the ink between the nozzle arrays was observed. However, adhesion of the ink around the nozzles was slightly observed.
C: Adhesion of the ink around the nozzles was observed.
D: Most of the nozzle plate was covered with the ink.

Cleaning Frequency

With the ink composition 1 or 2 shown in Table 1, a solid image was printed on the cloth at the same time as evaluation of contamination by adhesion of the ink onto a nozzle plate under the same conditions, using the remodeled GS6000 printer, and the nozzles were inspected for the presence of undischarged nozzles each time one sheet was printed. It was determined that cleaning is needed at the time when 0.3% or greater of the number of nozzles with respect to the total number of nozzles used do not discharge. The cleaning frequency was evaluated according to the following criteria based on the number of printed sheets at the time when cleaning was determined to be needed.

Evaluation Criteria
A: 81 sheets or more
B: 51 sheets to 80 sheets
C: 21 sheets to 50 sheets
D: 20 sheets or fewer Concealing Property of Image The first printed material in the evaluation of contamination by adhesion of ink onto a nozzle plate was evaluated. Specifically, L* value was measured by a colorimetric device (product name, "Gretag Macbeth Spectrolino" manufactured by X-RITE Co., Ltd.), and the concealing property of the image was evaluated according to the following evaluation criteria based on the obtained L* value.

Evaluation Criteria
A: 90 or greater
B: 80 to less than 90
C: 70 to less than 80
D: Less than 70

Printing Speed

With the ink composition 1 or 2 shown in Table 1, a solid image of 20 cm×20 cm was printed on T-shirt cloth (heavy-weight black texture manufactured by HANES Inc.) of 100% cotton which was set to the size of about A4 size using the remodeled GS6000 printer. The printing speed was evaluated according to the following evaluation criteria.

Evaluation Criteria
B: The same as Example 1
D: More than twice the number of passes (main scanning number) were necessary compared to Example 1

Drying Speed

With the ink composition shown in Table 1, after printing one white solid image in the same manner as in the evaluation of the contamination by the adhesion of the ink onto the nozzle plate, immediately, a solid image (ink droplet 7 ng, dot density 4320×720 dpi) of 10 cm×10 cm inside the white solid image using the cyan ink was doubly printed by a C nozzle lane in FIG. 1 using the remodeled GS6000 printer. The bleeding at a boundary of the white image and the color image was visually observed. As the cyan ink, an ink in which cyan pigment, Pigment Blue 15:3 (manufactured by Clariant Co., Ltd.) of 4% by mass instead of titanium dioxide in the white ink composition 2 was included was adjusted to be used. The boundary region of the white solid image and the cyan image was visually observed.

Evaluation Criteria
B: There is no bleeding
D: There is bleeding

TABLE 2

| | Comparative Example 1 | Comparative Example 2 | Comparative Example 3 | Comparative Example 4 | Comparative Example 5 | Comparative Example 6 |
| --- | --- | --- | --- | --- | --- | --- |
| Ink No. | 1 | 1 | 1 | 1 | 1 | 1 |
| Distance between nozzle arrays mm | 12 | 12 | 19.5 | 12 | 19.5 | 12 |
| Amount of the ink of ink droplet ng | 7 | 14 | 7 | 7 | 7 | 7 |
| Nozzle density dpi | 720 | 720 | 360 | 360 | 720 | 720 |
| Discharging frequency kHz | 43.2 | 21.6 | 43.2 | 43.2 | 7.2 | 7.2 |
| Recording medium | Cloth | Cloth | Cloth | Cloth | Cloth | Cloth |
| Recording medium support portion material | Acryl plate | Acryl plate | Acryl plate | Acryl plate | Acryl plate | Acryl plate |
| Dot formation density dpi | 8640 × 1440 | 4320 × 1440 | 8640 × 1440 | 8640 × 1440 | 1440 × 1440 | 2880 × 1440 |
| Adhered amount of the ink mg/inch$^2$ | 174 | 174 | 174 | 174 | 29 | 58 |
| Contamination by adhesion of ink onto nozzle plate | D | C | A | A | A | B |
| Cleaning frequency | D | C | A | A | A | B |
| Concealing property of image | B | B | B | B | D | C |

TABLE 2-continued

| Printing speed | B | B | D | D | B | D |
|---|---|---|---|---|---|---|
| Drying speed | B | D | B | B | B | B |

|  | Comparative Example 7 | Comparative Example 8 | Comparative Example 9 | Comparative Example 10 |
|---|---|---|---|---|
| Ink No. | 1 | 1 | 1 | 1 |
| Distance between nozzle arrays mm | 12 | 12 | 12 | 12 |
| Amount of the ink of ink droplet ng | 7 | 7 | 7 | 7 |
| Nozzle density dpi | 720 | 720 | 720 | 720 |
| Discharging frequency kHz | 7.2 | 43.2 | 43.2 | 14.4 |
| Recording medium | Cloth | Normal paper | Cloth | Cloth |
| Recording medium support portion material | Acryl plate | Acryl plate | Aluminum | Acryl plate |
| Dot formation density dpi | 1440 × 1440 | 8640 × 1440 | 8640 × 1440 | 2880 × 1440 |
| Adhered amount of the ink mg/inch$^2$ | 29 | 174 | 174 | 58 |
| Contamination by adhesion of ink onto nozzle plate | B | C | C | D |
| Cleaning frequency | B | C | C | D |
| Concealing property of image | D | B | B | C |
| Printing speed | B | B | B | B |
| Drying speed | B | B | B | B |

TABLE 3

| Ink composition | 1 | 2 |
|---|---|---|
| Titanium dioxide | 8 | 4 |
| Takelac WS-6021 | 26.7 | 13.4 |
| Dispersant DEMOL NL | 1.2 | 0.6 |
| Glycerin | 7 | 7 |
| Triethylene glycol | 3 | 3 |
| Triethylene glycol monobutyl ether | 1 | 1 |
| BYK-348 | 0.3 | 0.3 |
| Ion exchange water | balance | balance |
| Total | 100 | 100 |
| Solid content (%) | 16.5 | 8.3 |

From the results above, in the case of using the ink jet recording method which it was found that satisfies requirements of the invention, the adhesion of the ink composition to a nozzle plate is unlikely to occur, the cleaning frequency is low, images with the excellent concealing property can be printed and the printing speed is excellent. In contrast, it was found that in Comparative Examples 1, 2, and 8 to 10 in which the distance between the nozzles of the first array and the second array is small, contamination by the adhesion of the ink composition to the nozzle plate occurs and the cleaning frequency is high.

In Comparative Examples 3 and 4, since the nozzle density is low and the number of nozzles (the number of nozzles being used) is small, there is a need to increase the number of passes in order to set a predetermined adhered amount of the ink, and a large number of passes means that sub-scanning between passes also increases, and therefore, the effect on the reduction of the printing speed is large. Moreover, in Comparative Examples 3 and 4, it is also conceivable that while setting the nozzle density to 360 dpi, by doubling the length in the sub-scanning direction of the nozzle array, the number of nozzles is doubled, and therefore, the number of nozzles becomes the same as in Example 1. However, in this case, the length in the sub-scanning direction of the head increases, and therefore, it is not preferable from the viewpoint of miniaturization of the recording apparatus.

In Comparative Examples 5 and 7, the frequency of the discharge is low. However, since the number of passes is the same as in Example 1, the printing speed was not decreased. However, the dot formation density decreased and the adhered amount of the ink became small, and therefore, the concealing property of the image was reduced. In Comparative Example 6, by doubling the number of passes compared with Comparative Example 7, the dot formation density and the adhered amount of the ink were increased. However, the printing speed was reduced.

Moreover, in Example 3 and Comparative Example 8, normal paper was used as a recording medium. However, deformation was observed on the recording medium by increasing the adhered amount of the ink.

Furthermore, in the case where the amount of the ink of the ink droplet is large, it was found that ink stains and the cleaning frequency tend to be comparatively improved, and the drying speed tends to be reduced. On the other hand, in the case where the amount of the ink of the ink droplet is small, in addition to the excellent drying speed, dots can be formed at a high dot formation density without reducing the printing speed, and this is advantageous from the viewpoint of a high-definition patterning of an image. On the other hand, from a fact that the ink stains and the cleaning frequency tended to be deteriorated, it was found that the invention is particularly useful.

The ink jet recording method of the invention is industrially applicable as a method which records an ink composition on a recording medium, particularly cloth.

The entire disclosure of Japanese Patent Application No.: 2013-027616, filed Feb. 15, 2013 is expressly incorporated by reference herein.

What is claimed is:
1. An ink jet recording method,
wherein an ink jet head having a first nozzle array and a second nozzle array which is arranged along the first nozzle array, in which the distance between the first nozzle array and the second nozzle array is between 15 mm and 100 mm, and a nozzle density of the first nozzle array and a nozzle density of the second nozzle array are 600 dpi or greater is used, and while varying the relative position of the ink jet head in a direction intersecting an array direction of the first nozzle array and the second nozzle array with respect to a recording medium, an ink composition is adhered to the recording medium by performing a scanning which discharges the ink composition at a frequency of 12 kHz or greater from nozzles in the first nozzle array and the second nozzle array, wherein the first nozzle array and the second nozzle array are configured to discharge ink compositions having the same composition as each other; further wherein an adhered amount of the ink composition discharged from the first nozzle array and the second nozzle array with respect to the recording medium is 50 mg/inch$^2$ or greater.

2. The ink jet recording method according to claim 1, wherein an adhered amount of the ink composition with respect to the recording medium is 150 mg/inch$^2$ or greater.

3. The ink jet recording method according to claim 1, wherein the ink composition includes a solid content of 12% by mass or greater.

4. The ink jet recording method according to claim 1, wherein the ink composition includes a coloring material, a resin emulsion and a water-soluble solvent.

5. The ink jet recording method according to claim 1, wherein the ink composition is a white ink composition including titanium oxide.

6. The ink jet recording method according to claim 1, wherein recording is performed by performing a plurality of the scannings.

7. The ink jet recording method according to claim 1, wherein the recording medium is cloth.

8. The ink jet recording method according to claim 1, wherein the recording medium is supported by a recording medium support portion having a surface formed of a resin, from the opposite side of the side opposed to the ink jet head of the recording medium.

9. The ink jet recording method according to claim 1, wherein a once discharged ink amount of the ink composition which is discharged from one nozzle is 10 ng or less.

10. The ink jet recording method according to claim 1, wherein the ink jet head has another nozzle array for discharging another ink composition different from the ink composition on at least one side of the side which is on the opposite side of the second nozzle array, of the first nozzle array and the side which is on the opposite side of the first nozzle array, of the second nozzle array.

11. An ink jet recording apparatus, wherein recording is performed by the ink jet recording method according to claim 1.

12. An ink jet recording apparatus, wherein recording is performed by the ink jet recording method according to claim 2.

13. An ink jet recording apparatus, wherein recording is performed by the ink jet recording method according to claim 3.

14. An ink jet recording apparatus, wherein recording is performed by the ink jet recording method according to claim 4.

15. An ink jet recording apparatus, wherein recording is performed by the ink jet recording method according to claim 5.

16. An ink jet recording apparatus, wherein recording is performed by the ink jet recording method according to claim 6.

17. An ink jet recording apparatus, wherein recording is performed by the ink jet recording method according to claim 7.

18. An ink jet recording apparatus, wherein recording is performed by the ink jet recording method according to claim 8.

19. An ink jet recording apparatus, wherein recording is performed by the ink jet recording method according to claim 9.

20. An ink jet recording apparatus, wherein recording is performed by the ink jet recording method according to claim 10.

\* \* \* \* \*